US006438623B1

(12) United States Patent
Ryan

(10) Patent No.: US 6,438,623 B1
(45) Date of Patent: Aug. 20, 2002

(54) TRANSFER UNIT EXTENDING BETWEEN TWO OR MORE CABINETS FOR EXPANSION OF TAPE LIBRARY SYSTEMS

(75) Inventor: Dennis M. Ryan, Redwood City, CA (US)

(73) Assignee: Ampex Corporation, Redwood City, CA (US)

( * ) Notice: Subject to any disclaimer, the term of this patent is extended or adjusted under 35 U.S.C. 154(b) by 0 days.

(21) Appl. No.: 09/293,007

(22) Filed: Apr. 16, 1999

(51) Int. Cl.$^7$ .......................... G06F 13/10; G06F 13/14
(52) U.S. Cl. ............................. 710/2; 710/15; 710/18; 360/92; 369/77.2; 414/277; 414/749; 414/786
(58) Field of Search .................. 360/92; 369/77.2; 414/749, 786, 277; 710/2, 15, 18

(56) References Cited

U.S. PATENT DOCUMENTS

| | | | |
|---|---|---|---|
| 4,820,109 A | | 4/1989 | Witt |
| 4,864,438 A | * | 9/1989 | Munro .......................... 360/92 |
| 4,945,429 A | * | 7/1990 | Munro et al. .................. 360/92 |
| 6,011,669 A | * | 1/2000 | Apple et al. ................... 360/92 |
| 6,059,509 A | * | 5/2000 | Ostwald ....................... 414/277 |

OTHER PUBLICATIONS

World Class Performance In Data Storage And Management (Brochure), Dated 1997, by SONY.
Automated Mixed–Media Libraries (Brochure), Dated, Aug., 1998, by E–MASS.

* cited by examiner

Primary Examiner—Jeffrey Gaffin
Assistant Examiner—Rehana Perveen
(74) Attorney, Agent, or Firm—G. B. Almeida; J. G. Mesaros; J. D. Talcott

(57) ABSTRACT

A relatively simple and easily installed transfer unit is disclosed employing a movable cartridge bin assembly which travels horizontally between two or more cabinets of respective tape cartridge library systems, to enable the expansion of individual library systems thereby increasing overall mass storage system capacity. The bin assembly is presented to a typical cartridge handling robot of respective library systems as if it were part of the stationary bin array housed within the cabinet, which allows the cartridge to be accessed and loaded in a constant orientation. A drive means provides the translation of the bin assembly and cartridge, and depots at preset stop locations include sensor means for indicating the location of the bin assembly and the presence of a cartridge in the bin assembly.

39 Claims, 6 Drawing Sheets

TRANSFER UNIT EXTENDING BETWEEN TWO OR MORE CABINETS FOR EXPANSION OF TAPE LIBRARY SYSTEMS

The present invention relates generally to mass storage or tape library systems and, in particular, to a self contained, easily installed apparatus and method for transferring tape cartridges between distinct tape library systems to increase the storage capacity of an overall mass storage system.

BACKGROUND OF THE INVENTION

There are a variety of "mass storage" or "tape library" systems, consisting generally of one or more recording/reproducing tape drives, a number of tape cartridges stored in bins, and a robotics assembly for transferring cartridges to and from the tape drives and the cartridge bins.

Most of the typical mass storage or library systems are not "expandable", in that additional cartridges beyond their local storage capacity of cartridge bins must be inserted and removed manually. Those systems which offer expandability with some form of "pass-through" or conveyor system are generally slow, difficult to access for maintenance, or are suitable only for very large data-warehousing applications.

Accordingly, there is a need for a simple self contained means of mechanically transferring cartridges between adjacent distinct library systems to increase overall mass storage system capacity, and one which can be easily installed and expanded in an installation at a customer's site.

SUMMARY OF THE INVENTION

The present invention overcomes the above-mentioned disadvantages of the typical tape library expanding apparatus while providing a relatively simple and easily installed transfer unit employing a movable cartridge bin assembly which travels horizontally between two or more cabinets of respective tape library systems. The movable bin assembly is presented to a typical cartridge handling robot of respective library systems as if it were part of the stationary bin structure housed within the associated cabinet.

To this end, the transfer unit of the present invention is configured to work in conjunction with, for example, from two to four library systems generally contained in 24-inch rack cabinets, such as the DST-712 library system manufactured by Ampex Corporation, Redwood City, Calif., or with, for example, one, two or more DST-712 library systems and a DST-812 library system also manufactured by Ampex Corporation.

More particularly, the transfer unit includes a support means such as a base channel which extends into for example two adjacent library systems, or through a third or fourth library system in a three or four library system configuration. A movable bin assembly is translatably supported by the base channel and is bidirectionally moved rapidly between the library systems. The bin assembly is stopped accurately and repeatedly at preset locations, herein termed "depots", where there is one depot within each cabinet of the library systems for a respective transfer unit. A drive means, consisting of, for example, a motor driven cable drum and an elongated cable wrapped about the cable drum, secured to the bin assembly and extending the length of the support means, causes the rapid and accurate movement of the bin assembly between a depot in each respective library system. The depot locations are "learned" by each cartridge handling robot of the library systems as if they were permanent addresses within their respective stationary bin arrays. Optical sensors associated with each depot accurately locate each depot and thus the respective bin assembly stop location. An optical sensor also determines whether a cartridge is present in the bin assembly at any of the depots.

As may be seen, the present invention provides for the retrieval and loading of a cartridge in a constant orientation, that is, without need to rotate the cartridge.

An alternative embodiment of the present invention employs a dual cartridge bin assembly which enables the transfer unit of the invention to receive a cartridge from the robot, at the same time that the transfer unit delivers a cartridge to that same robot for storage or delivery to the tape drive unit.

DETAILED DESCRIPTION OF THE EMBODIMENT

Figure 1:
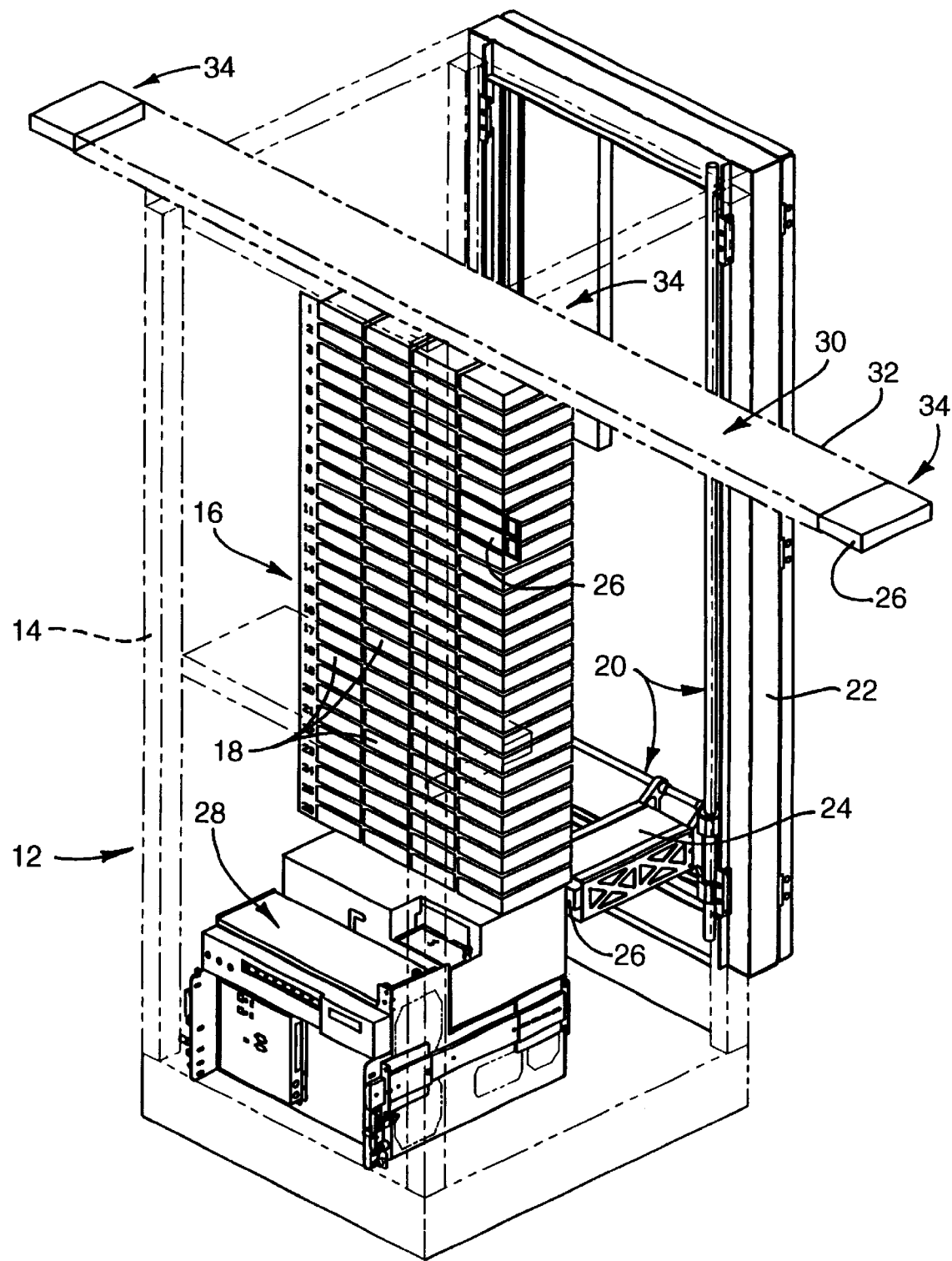
FIG. 1 is a perspective view of a tape library system illustrating in block form the addition of a cartridge transfer unit of the present invention.

FIG. 1 illustrates the use of the present invention in association with, for example, a tape library system 12 such as the DST 712 library system of previous mention. The library system 12 includes generally a cabinet 14 shown in phantom lines, a stationary bin array 16 formed of for example four columns of cartridge bins 18, an X-Y-Z cartridge handling robot 20 including a support frame 22 integrally secured to the rear of the cabinet 14 to allow a cartridge handling assembly 24 of the robot to selectively scan and/or access all the bins and thus respective cartridges 26 in the bins. The library system 12 also includes a tape recorder/reproducer, herein called a "tape drive" unit 28 located at the bottom of the cabinet and accessible to the robot 20.

In accordance with the present invention, several top rows of bins 18 are removed from the stationary bin array, and are replaced by a transfer unit 30 of the invention. The transfer unit illustrated in FIG. 1 is of a length which allows it to transfer cartridges between three adjacent library systems 12, wherein the library system shown would be the middle system. The transfer unit 30 in this embodiment includes a support means 32 (see base channel 42 in FIG. 4) passing through the middle library system and extending a selected distance into both outside library systems, and has three stop locations, herein called "depots" 34 along the support means length. The cartridge stop location may be located in register vertically with a selected column of bins 18 in respective library systems 12 as illustrated herein, but alternatively may be located in any position which is accessible to the respective cartridge handling robot.

Figure 2:
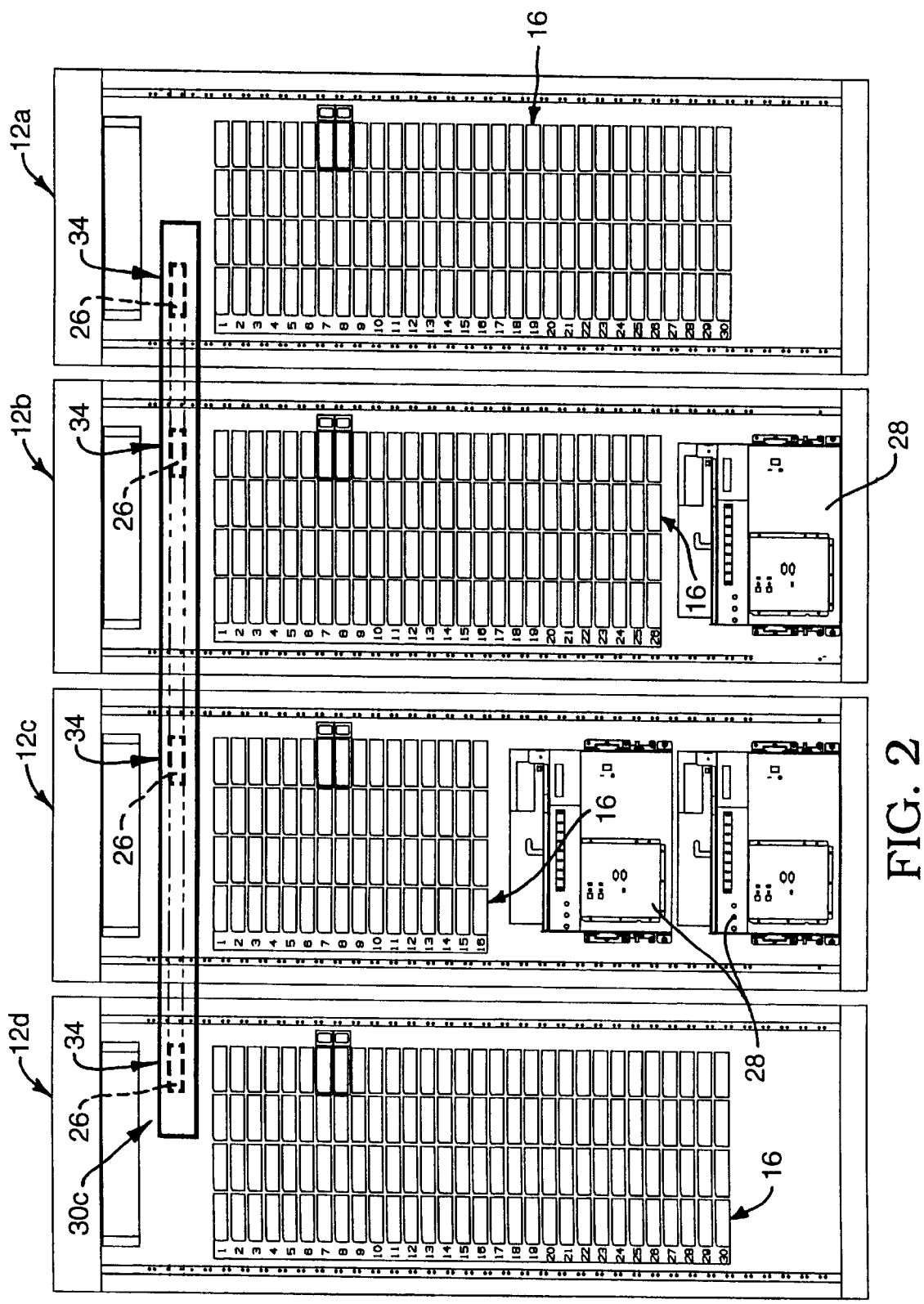
FIG. 2 is an elevation view of a plurality of tape library systems forming an overall mass storage system and illustrating in block form the addition of a cartridge transfer unit of the present invention to expand the overall mass storage system.

FIG. 2 illustrates the use of an alternative embodiment of the invention comprising a single transfer unit 30*c* in a multiple library system formed of four adjacent library systems 12*a* through 12*d*. Thus, the cartridge handling robot of each library system has access to a respective depot 34 whereby a cartridge 26 can be transferred from one library system to another. The cartridges (or a single cartridge being moved from depot to depot) are illustrated in phantom line at the respective depots 34 along the transfer unit 30*c* in respective stop locations of the library systems 12*a*–12*d*. As illustrated in FIG. 2, a library system 12 may include one, two or no tape drive units 28 at the expense of deleting a corresponding number of cartridge bins.

Figure 3:
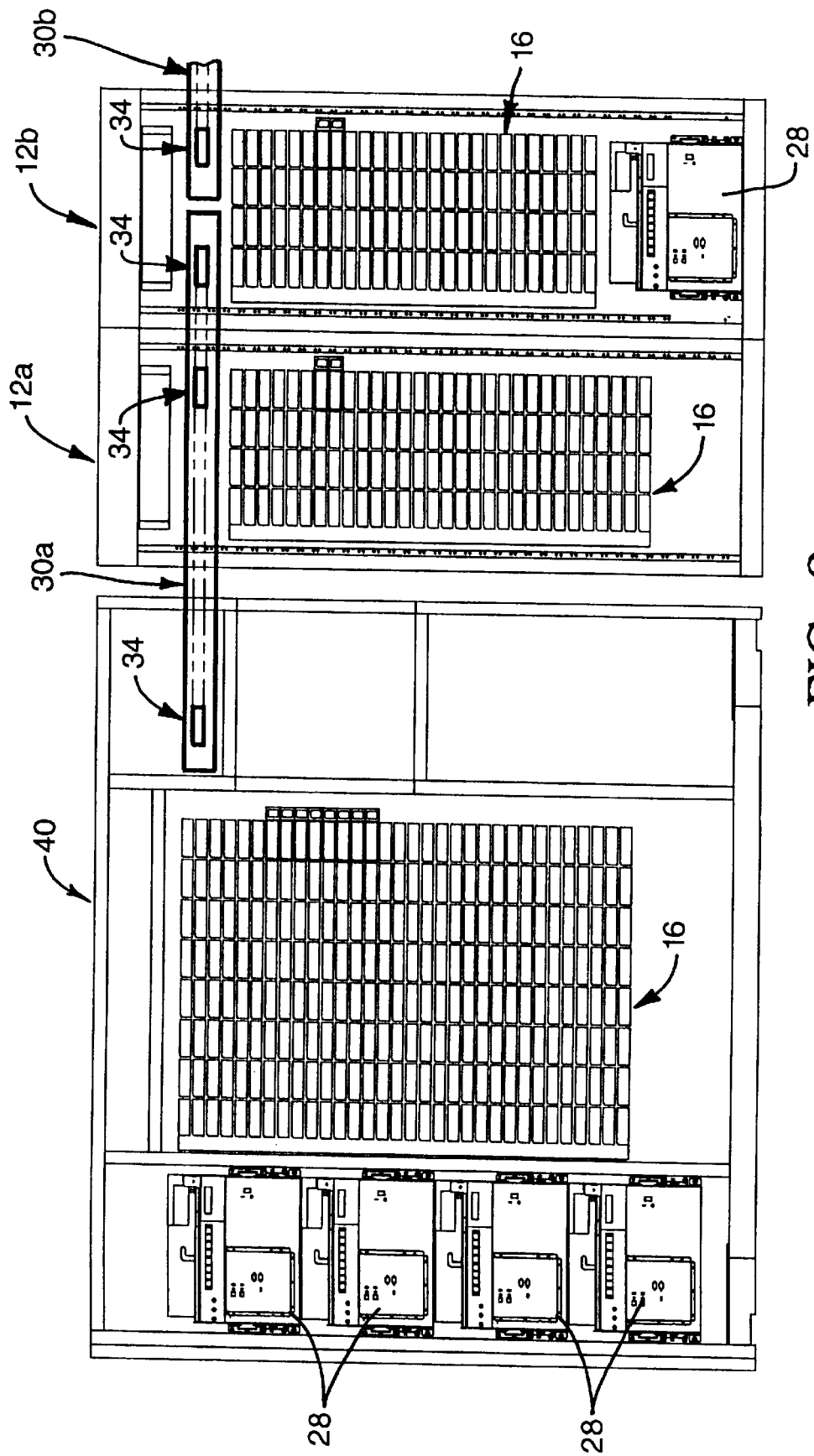
FIG. 3 is an elevation view of an overall mass storage system formed of different library systems and illustrating in block form the addition of cartridge transfer units of the present invention.

FIG. 3 illustrates another embodiment of the invention including, for example, a transfer unit 30*a* abutted end-to-end with an adjacent transfer unit 30*b* to expand a large library system 40, such as the DST-812 of previous mention, into a still larger mass storage system, by the addition of several additional library systems 12*a*–12*b*, etc. Various additional library systems could be added to the right of the system 12*b*, with the length of the transfer unit being determined by the number of additional library system. Thus, the relatively large library system 40, or a smaller library system 12, can be further expanded by the addition of a respective end of the transfer unit 30*a*, whereby a depot 34 therein is accessible to the cartridge handling robot of the larger system 40, to thereby tie the larger system with any number of additional library systems. A cartridge handling robot of the library system 12*b* accesses both movable bin assemblies of the transfer units 30*a* and 30*b* whereby a cartridge 26 can be passed from one transfer unit to another and thus throughout the library systems of the overall mass storage system. This feature enables extensive expansion of the overall system by the abutting of additional transfer units and using the robots to move cartridges 26 between the abutting transfer units. In system 40, four tape drive units 28 are illustrated along with a relatively large stationary bin array 16.

Figure 4:
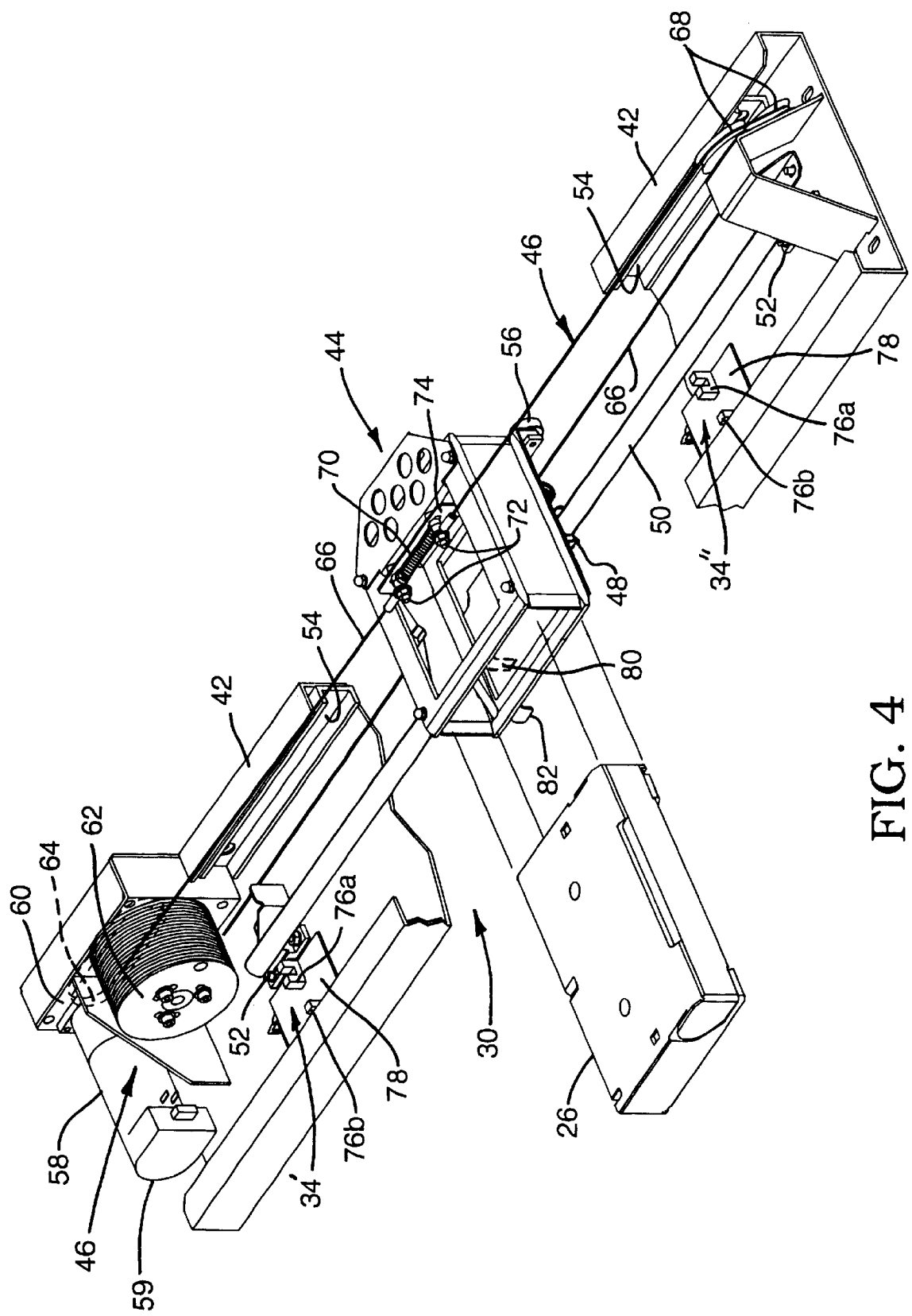
FIG. 4 is a perspective view illustrating an embodiment of the present invention.

FIG. 4 illustrates an embodiment of the present invention comprising a cartridge transfer unit 30 including a support means in the form of a base channel 42, a movable cartridge bin assembly 44 and a bin assembly drive means 46 for imparting translation of the bin assembly, with or without a cartridge 26, horizontally between depots 34' and 34". The bin assembly 44 is supported by two linear bearings 48 (further shown in FIG. 6) secured to the bottom of the bin assembly, for translation along a shaft 50 extending essentially the length of the base channel 42 between depots 34', 34". The shaft 50 in turn is supported in various places on blocks 52 firmly secured to the base channel 42. The linear bearings 48 are of the "open type" which allows them to pass freely over the support blocks 52. The base channel includes a fixed guide channel 54 attached to one side thereof. The bin assembly includes a pair of guide rollers 56 (further shown in FIG. 6) which run within the guide channel 54, to thus prevent the bin assembly from tipping about the shaft 50.

The drive means 46 includes a tachometer 59 integrally mounted with a gearmotor 58, with the combination mounted to a plate 60 secured to one end of the base channel 42. The shaft of a cable drum 62 is supported on bearings (not shown) secured to the plate 60, and the drum is driven by a timing belt 64 extending between the gearmotor 58 and the cable drum 62. A nylon coated steel cable 66 is attached at the top of one end of the bin assembly 44 and is wrapped several turns (for example, ten) around the cable drum, entering at the top and exiting at the bottom of the drum. The cable 66 then is passed under the bin assembly 44, around a pair of turnaround pulleys 68 at the end of the base channel opposite the cable drum end, and is again attached to the top of the bin assembly. Cable tension is provided by a spring 70 secured between the ends of the cable. The attachment points of the cable ends include fasteners 72 secured to respective ends of the cable 66 and the spring 70, and disposed within a slot in a mounting bracket 74 to allow slight longitudinal movement of the spring to provide the cable tension. In addition, the cable 66 is anchored to the drum at a position which never winds off the drum to insure that the bin assembly position is precisely repeatable, that is, so there is no slippage between the cable 66 and cable drum 62.

Although a cable and cable drum drive means 46 is illustrated herein, other means may be used to drive the bin assembly 44. For example, a timing belt similar to the timing belt 64 of previous mention may be used in combination with a toothed pulley driven by the gearmotor 58 and timing belt 64 and a toothed turnaround pulley (not shown) at opposite ends of the base channel 42. The bin assembly 44 is attached to the timing belt.

Thus, the moveable bin assembly 44 is able to translate rapidly between library systems on a precision rail system, i.e., the shaft 50. For example, the maximum travel time for the bin assembly for the longest translation distance is of the order of two seconds. Since the cable drive means 46 is tachometer controlled via the tachometer 59 integral with the gearmotor 58, the bin assembly can be stopped accurately and repeatedly at the preset stop locations, that is, the depots 34, within each library system cabinet. These stop locations or depots are then "learned" by each of the cartridge handling robots as if they were addresses within the stationary bin arrays (for example bins 18 of FIG. 1) of each library system 12. It is pointed out that because of the placement of the present transfer unit with respect to the stationary bin arrays 16 and the library systems 12, the transfer of the cartridge 26 is conducted without the need to rotate, tip, etc., the cartridge; that is, the cartridge is retrieved and loaded between the stationary bins 18, the movable bin assembly 44 and the tape drive units 28, in a constant orientation.

When the bin assembly 44 is stopped at any depot 34 (such as depots 34', 34 "of FIG. 4), a sensing device is used to determine the presence of the bin assembly 44 at the respective depot 34. Likewise, another sensing device is used to determine whether a cartridge 26 is present in the bin assembly as the latter arrives at the depot. This eliminates the need for any electronics on-board the movable bin assembly 44, a decided advantage.

Figure 5:
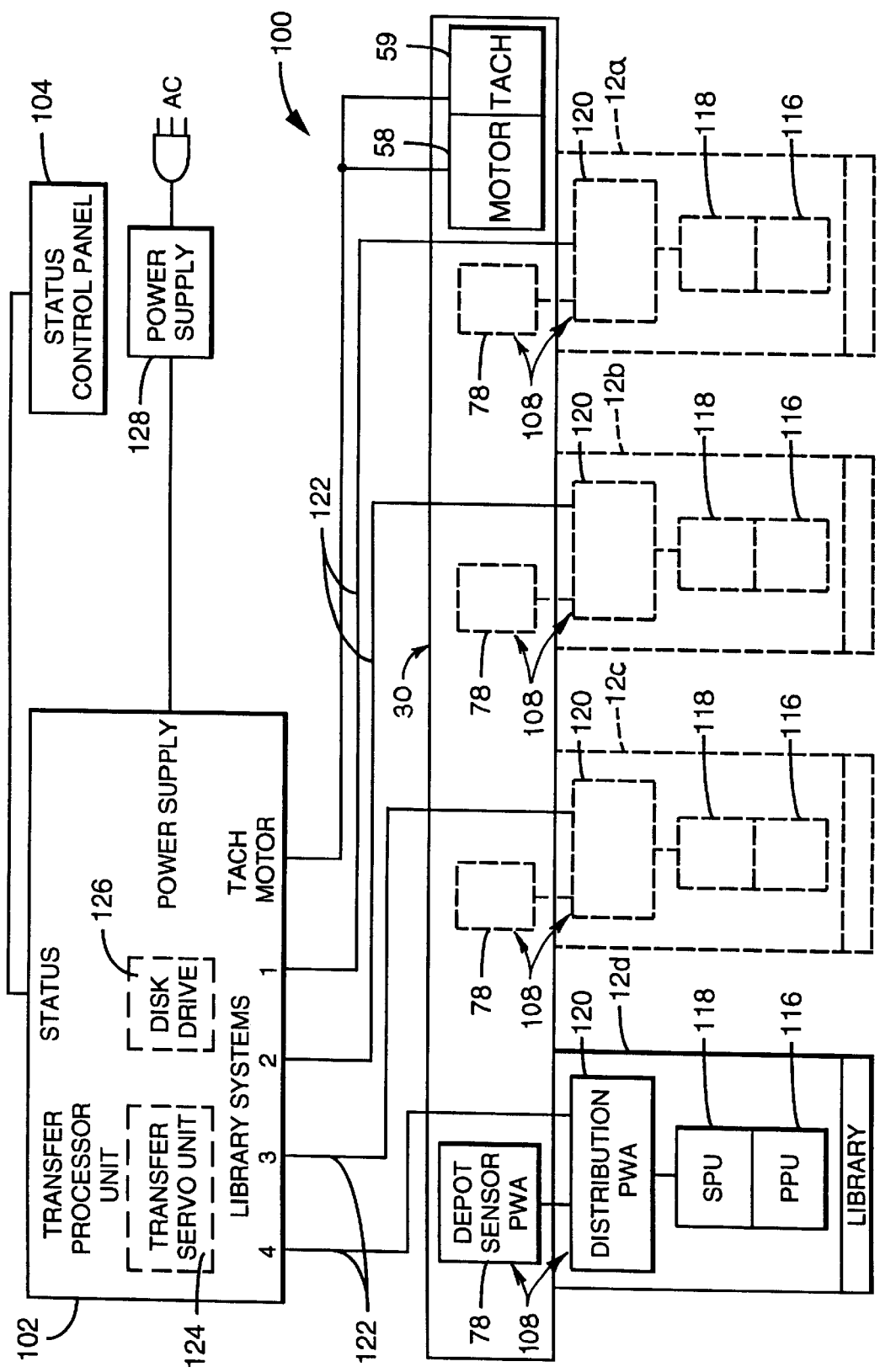
FIG. 5 is a block diagram illustrating in accordance with the invention, a transfer servo circuit for sensing and controlling the movements of a movable bin assembly relative to the various depots associated with respective library systems.

More particularly, the sensing devices used at each depot 34 and in the bin assembly 44 are formed for example of an optical sensor and a light emitting diode (LED) as illustrated in FIG. 4, wherein each depot contains two optical sensor/LED sets 76*a* and 76*b*. The sets 76*a*, 76*b* are mounted on respective printed wiring assembly (PWA) boards 78 secured within the base channel 42 in line with the travel path of the bin assembly 44. A bin assembly flag 82 secured to the bottom of the assembly 44 is configured to interrupt the LED beam and activate the optical sensor of the optical sensor/LED set 76*b* at each depot 34. The electrical signal from the optical sensor of the set 76*b* is supplied to a transfer servo circuit 100 such as illustrated in FIG. 5, to provide the necessary information for determining the presence of the bin assembly 44 at the respective depot. Exact positioning of the bin assembly 44 is determined by an electrical signal, or pulse, from the tachometer 59 which occurs only once during each revolution of the motor. The width of the bin flag 82 is such that only one such tachometer pulse can be detected while the LED beam of the sensor/LED set 76b is interrupted, thus defining a very exact repeatable location.

Similarly, a cartridge flag 80 pivotally secured to the bin assembly 44 is engaged by the insertion of a cartridge, so as to move downward and interrupt the LED beam and activate the optical sensor of the optical sensor/LED set 76a at each depot 34. If there is no cartridge 26 in the bin assembly 44, the flag 80 remains in the up position and is not in a position to activate the set 76a. Thus, the transfer servo circuit 100 of previous mention can detect the presence or absence of a cartridge 26 when the bin assembly 44 arrives at a depot.

FIG. 5 illustrates, by way of example, a transfer servo circuit 100 for sensing and controlling the movements of the respective movable bin assembly 44 and cartridge 26 between two or more library systems 12. For example, the mass storage system is illustrated as having four library systems 12a–12d as previously illustrated in FIG. 2, utilizing a four cabinet transfer unit of the invention spanning all four of the cabinets 12a–12d.

The transfer servo circuit 100 includes a transfer processor unit (TPU) 102, a status control panel 104 and a plurality of transfer unit circuits 108 associated with the respective library systems in associated cabinets.

The library systems 12a–12d typically each include a protocol processor unit (PPU) 116 and a servo processor unit (SPU) 118 which control the operation of each library system and particularly the cartridge handling robots (for example, FIG. 1, robot 20) in each library system. While these units 116, 118 do not per se comprise part of the present invention, they do co-act closely with the invention transfer unit 30 to enable the transfer of cartridges to and from each library system via the cartridge handling robots in association with the transfer unit(s). The SPU 118 operates three servo circuits (X, Y, Z axes) in the robot circuitry, by driving the respective X, Y, Z motors which move the robot in response to feedback signals from a tachometer of each motor. The PPU 116 provides pre-programmed commands to the servo circuits of the cartridge handling robot, such as, "scan all bins to determine cartridge locations", "pull a cartridge from a certain bin and transfer it to a certain tape drive" or vice versa, etc. Such commands are delivered across interfaces between the PPU 118 and the SPU 116. The PPU 116 in turn is driven by a host computer via a standard computer interface (not shown) in a conventional configuration of a library system 12 or 40.

Since the library systems 12a–12d of FIG. 5 are identical, only the system 12d is described herein by way of example, while the library systems 12a–12c are depicted in phantom line. The transfer unit circuits 108–114 of the invention each include a distribution PWA board 120 with connections to the depot PWA board 78 of previous mention corresponding to the respective library system, to the SPU 118 and to the TPU 102. The distribution PWA board 120 is simply a passive connection board which distributes signals between the PWA board 78, the SPU 118 and the TPU 102 via a respective communication line 122 which extends from each distribution PWA board 120 to a respective input of the TPU 102. As described in FIG. 4, a depot 34 is located at each stop location in respective library systems and there are two optical sensor/LED sets 76a, 76b, at each depot. The set 76a senses whether a cartridge 26 is present in the bin assembly 44, while the other set 76b senses whether the bin assembly is in position at the depot. That is, the optical sensor/LED set 76b is used to verify that the bin assembly is in fact stopped at the respective depot.

The transfer processor unit 102 includes a transfer servo unit 124 which in turn is coupled to a disk drive 126. The status control panel 104 is coupled to a status input of the transfer processor unit 102, and AC electrical power is supplied thereto via a power supply 128 and a power supply input to operate the transfer unit(s) 30. The status control panel 104 may comprise for example a lighted display on the front of the library system cabinet which includes a plurality of lighted indicators representing each depot and a lighted moving icon which represents the bin assembly 44 and indicates at which depot 34 that is, which library system cabinet, the bin assembly is located. The panel 104 also includes a lighted icon which indicates whether there is a cartridge 26 in the bin assembly 44.

The bin assembly 44 is positioned at specific depots by means of a servo circuit in the transfer servo unit 124, in response to tach pulses from the tachometer 59 integral with the gearmotor 58. Accordingly, a respective digital number corresponding, for example, to a specific number of tachometer pulses, identifies a particular stop location and thus the depot 34 corresponding to that stop location. In turn, the optical sensor/LED set 76b of the depot PWA board 78 generates a single bit whose state indicates whether the bin assembly 44 is at a particular depot 34. The optical sensor/LED set 76a of device 121 generates a single bit whose state indicates whether a cartridge 26 is or is not present in the bin assembly 44.

Control of the movement and selection functions of the transfer unit 30 as well as of the cartridge handling robot in each of the library systems 12 is provided by the host computer and computer interface of previous mention. For example, the host computer may direct that a specific cartridge in one library system be loaded into a tape drive unit 28 in another library system. To this end, the host computer communicates with the respective robot 20, which also communicates with the respective transfer unit 30. The transfer unit 30 commands the robot to retrieve the desired cartridge 26 from the stationary bin array 16 and load it in the bin assembly 44 at the respective depot 34. The transfer unit then moves the cartridge to a depot 34 of the desired library system. The transfer unit then commands the respective robot to retrieve the cartridge from the bin assembly and load it into the desired tape drive unit 28.

The gearmotor 58 and integral tachometer 59 are coupled to a tachometer/motor input of the transfer processor unit 102, whereby power is supplied to the gearmotor and tach pulses are supplied from the tachometer 59 to the TPU 102.

Figure 6:
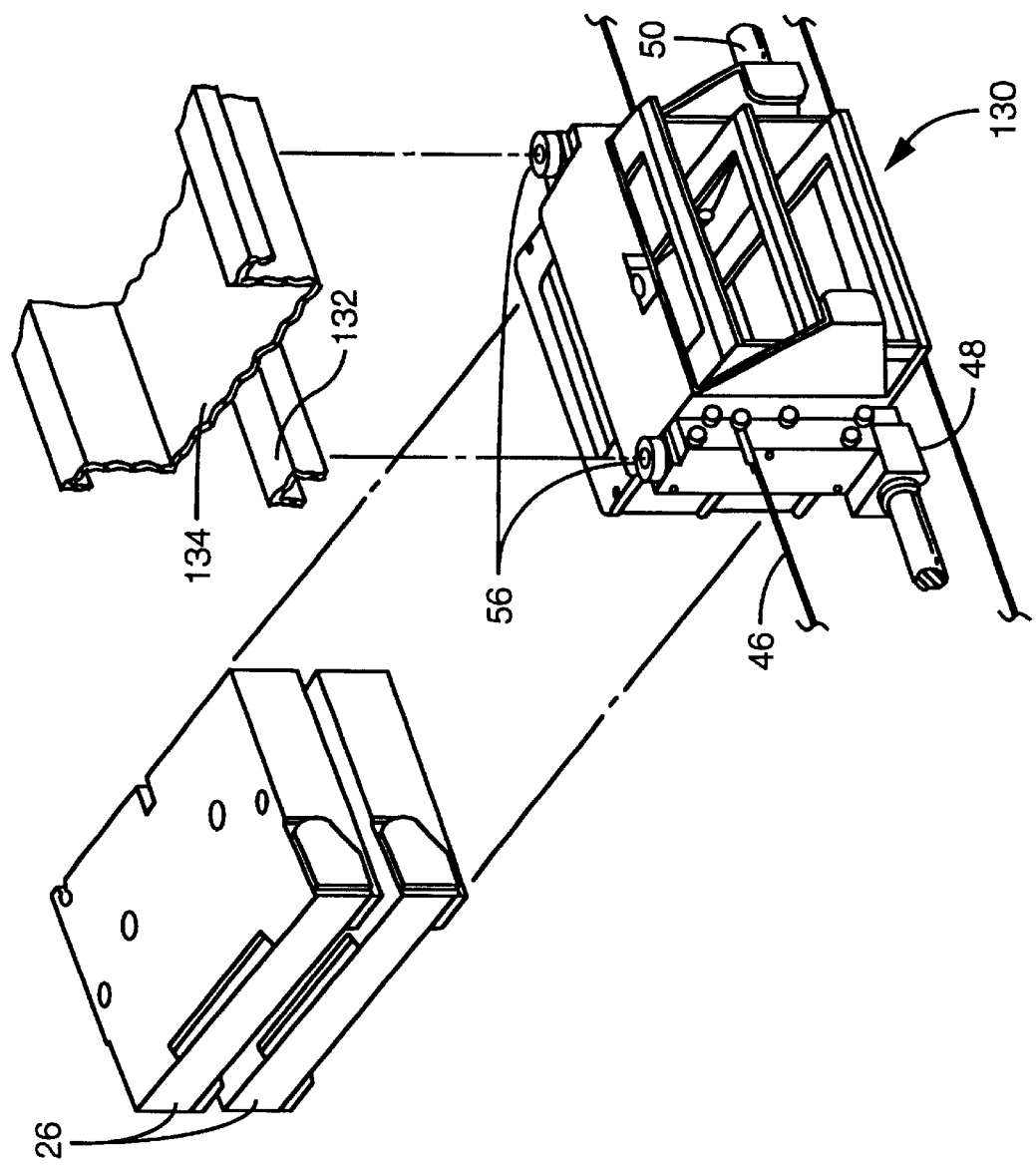
FIG. 6 is a partial perspective exploded view illustrating an alternative embodiment of the present invention.

FIG. 6 illustrates an alternative embodiment of the present invention, utilizing a dual cartridge bin assembly 130 in place of the single cartridge bin assembly 44 of FIG. 4. The dual cartridge carrying capacity enables the transfer unit to receive a cartridge from a cartridge handling robot simultaneously with delivering a cartridge via the transfer unit to the same robot for storage or loading into the tape drive unit. As in the transfer unit of FIG. 4, the bin assembly translates on the shaft 50 by means of a pair of linear bearings 48. In this instance, the guide rollers 56 are located at the top of the bin assembly 130 and run within a guide channel 132 extending above the bin assembly along an upper support channel 134 which is secured to the base channel 42 (FIG. 4). The guide rollers 56 and guide channel 132 prevent tipping of the bin assembly 130 about the shaft 50. As described previously, depots having optical sensing devices are included in the dual cartridge transfer unit and include respective optical sensor/LED sets for sensing bin and cartridge flags mounted in the bin assembly. A pair of flags and optical sensor/LED sets are used to indicate the presence or absence of respective cartridges in the dual cartridge bin assembly 130.

Although the invention has been described herein relative to specific embodiments, various additional features and advantages will be apparent from the description and drawings. For example, although optical sensing devices 121 are described herein, other sensing devices such as microswitches, etc., could be used as well. In addition, as previously described, a timing belt and associated toothed pulleys can be used in place of the cable and cable drum drive means 46 of FIGS. 4 and 6. Thus the scope of the invention is defined by the following claims and their equivalents.

What is claimed is:

1. Apparatus for transferring tape cartridges between distinct tape cartridge. library systems each having respective stationary cartridge bin arrays and cartridge handling robots, comprising:

support means extending between two or more of the library systems;

a movable bin assembly slidably supported by said support means for horizontal translation of the cartridges between the library systems;

drive means including a motor secured to the support means for bidirectionally translating the bin assembly with or without a cartridge along the support means; and stop locations disposed along the support means and positioned in each library system, said bin assembly being translatable to a selected stop location to allow a respective cartridge handling robot to access the bin assembly.

2. The apparatus of claim 1 wherein:

said bin assembly maintains a constant orientation relative to the library systems and thus relative to the stationary bin arrays such that the cartridges are retrieved, transported and loaded in a constant orientation with respect to the stationary bin arrays and the movable bin assembly.

3. The apparatus of claim 2 wherein:

the support means include an elongated shaft extending between two or more library systems; and the bin assembly includes bearing means slidably supported on the elongated shaft.

4. The apparatus of claim 3 wherein:

the support means further include an elongated base channel having a guide channel and extending into and/or through the one or more library systems;

said elongated shaft being supported by the base channel; and said bin assembly including guide roller means which run within the guide channel to prevent tipping of the bin assembly.

5. The apparatus of claim 1 including:

transfer processor means for controlling the movements of the bin assembly between library systems while coordinating the movements of the bin assembly with a cartridge handling robot in each library system.

6. The apparatus of claim 5 wherein:

the stop locations include depots having sensor means for detecting the presence of the bin assembly at a depot and of a cartridge in the bin assembly; and said sensor means of each depot being coupled to the transfer processor means.

7. The apparatus of claim 1 wherein:

the drive means include a cable drum secured to the support means and rotated by the motor, and a cable attached at first and second ends to the bin assembly with a portion of the cable wrapped several times about the cable drum such that selected rotation of the cable drum causes the bidirectional translation of the bin assembly.

8. The apparatus of claim 7 wherein:

the support means include an elongated base channel;

the cable drum and motor are secured to one end of the base channel;

said drive means include turnaround pulley means rotatably secured to the opposite end of the base channel;

wherein the first cable end extends from the bin assembly to wrap several wraps about the cable drum, extends back under the bin assembly to pass around the turnaround pulley means, whereupon the second cable end is secured to the bin assembly; and tensioning means coupled between the first and second cable ends to maintain the cable under tension.

9. The apparatus of claim 1 wherein:

the stop locations comprise depots located at each stop location and including sensor means for detecting the presence of the bin assembly at a depot and the presence or absence of a cartridge in the bin assembly.

10. The apparatus of claim 9 wherein the support means extend from a first depot in a first library system to a second depot in a second library system, wherein the first and second depots are located within the respective library systems so that the bin assembly is accessible to the respective cartridge handling robot when stopped at the respective depot, with transfer of the cartridge between the bin assembly and a stationary cartridge bin arrays in a constant orientation.

11. The apparatus of claim 9 wherein the support means extend from a first depot in a first library system to a second depot in a second library system by way of a third depot in a third library system, wherein the first, second and third depots are located within the respective library systems so that the bin assembly is accessible to the respective cartridge handling robot when stopped at the respective depot, with transfer of the cartridge between the bin assembly and a stationary cartridge bin array in a constant orientation.

12. The apparatus of claim 9 wherein the support means extend from a first depot in a first library system to a second depot in a second library system by way of a third and fourth depot in a third and fourth library system, wherein the first, second, third and fourth depots are located within the respective library systems so that the bin assembly is accessible to the respective cartridge handling robot when stopped at the respective depot, with transfer of the cartridge between the bin assembly and a stationary cartridge bin array in a constant orientation.

13. The apparatus of claim 9 wherein:

the sensor means include a bin flag on the bin assembly and a bin flag sensor located at a depot for detecting the presence of the bin flag, and a cartridge flag in the bin assembly and a cartridge flag sensor located at the depot for detecting the presence or absence of the cartridge flag.

14. The apparatus of claim 9 wherein the sensor means includes an optical sensor/LED device.

15. The apparatus of claim 9 further including:
a transfer processor unit for supplying electrical power to the motor, controlling the movements of the bin assembly in coordination with one or more cartridge handling robots and for monitoring the sensor means of each depot and thus the location of the bin assembly and presence of a cartridge.

16. The apparatus of claim 15 wherein the transfer processor unit includes:
a transfer servo unit for controlling the movement of the bin assembly and the associated movement of one or more cartridge handling robots; and
a status control panel for displaying the location of the bin assembly with respect to the library systems and the presence of a cartridge in the bin assembly.

17. The apparatus of claim 9 wherein said movable bin assembly includes dual bins for handling two cartridges simultaneously and including sensor means for detecting the presence or absence of a cartridge in each bin of the dual bin assembly as well as the presence of the dual bin assembly at a respective depot.

18. The apparatus of claim 1 wherein:
said support means, movable bin assembly, drive means and stop locations comprise a first transfer unit extending between a first plurality of the distinct tape cartridge library systems;
said apparatus including a second transfer unit of similar components abutted end-to-end with the first transfer unit within a common library system and extending from the common library system to one or more library systems of a second plurality of distinct library systems; and
wherein said first and second transfer units each include a stop location within the common library system which are accessible to the respective cartridge handling robot which transfers the cartridge between the transfer units.

19. The apparatus of claim 18 wherein additional transfer units are abutted end-to-end with the second transfer unit to provide interconnection of additional pluralities of library systems.

20. The apparatus of claim 18 including:
control means integral with respective transfer units for coordinating the translation of a respective movable bin assembly with the movement of the cartridge handling robots of respective library systems.

21. The apparatus of claim 20 including:
sensing devices located at respective stop locations for informing the control means of the presence of a movable bin assembly and of the presence of the cartridge in the bin assembly.

22. Apparatus for transferring tape cartridges between selected numbers of tape cartridge library systems having respective stationary cartridge bin arrays and cartridge handling robots, comprising:
a movable bin assembly translatably supported for essentially horizontal movement with respect to two or more of the library systems;
stop locations positioned along the essentially horizontal movement of the bin assembly and preset within each library system;
drive means coupled to the bin assembly for imparting the essentially horizontal movement thereto; and
a control circuit operatively coupled to the movable bin assembly and the stop locations for controlling the essentially horizontal movement of the bin assembly via the drive means as well as coordinating the movement of one or more cartridge handling robots, to effect the transfer of the cartridge between the two or more library systems.

23. The apparatus of claim 22 wherein the drive means includes:
a motor driven cable drum; and
a cable secured to the movable bin assembly and translatable along with the bin assembly via the cable drum to effect the horizontal movement and thus the transfer of the cartridge between library systems.

24. The apparatus of claim 22 wherein:
the control circuit includes a transfer processor unit; and
the stop locations include a depot having sensing means operatively coupled to the transfer processor unit for detecting the presence at a depot of the bin assembly and the presence or absence of a cartridge in the bin assembly.

25. The apparatus of claim 22 including:
a support structure extending between library systems for slidably supporting the movable bin assembly; and
said support structure including the stop locations in the form of depots having respective sensing means for detecting the presence of the bin assembly and the presence or absence of a cartridge therein at a respective depot.

26. The apparatus of claim 22 wherein:
said movable bin assembly includes dual bins for handling two cartridges simultaneously; and
said stop locations each include sensing means for informing the control circuit of the presence of the dual bin assembly at a respective stop location and the presence or absence of a cartridge in the dual bins of the dual bin assembly.

27. The apparatus of claim 26 wherein the dual bin assembly enables the apparatus to receive a cartridge from a respective cartridge handling robot at the same time that a second cartridge is delivered to the same cartridge handling robot for storage or use in the respective library system.

28. The apparatus of claim 22 wherein:
said movable bin assembly, drive means and stop locations comprise a first transfer unit extending between a first plurality of the tape cartridge library systems;
said apparatus including a second transfer unit of similar components abutted end-to-end with the first transfer unit within a common library system and extending therefrom to one or more library systems of a second plurality of library systems; and
wherein said first and second transfer units each include a stop location within the common library system which are accessible to a respective cartridge handling robot to allow the robot to transfer the cartridge between the transfer units.

29. The apparatus of claim 28 wherein additional transfer units are abutted end-to-end with the second transfer unit to add additional pluralities of library systems.

30. The apparatus of claim 22 wherein:
the stop locations include sensing devices for informing the control circuit of the presence of the bin assembly at a respective stop location and the presence of the cartridge in the movable bin assembly.

31. A method of transferring tape cartridges between a selected plurality of tape cartridge library systems having respective stationary cartridge bin arrays and cartridge handling robots, comprising:

providing transfer means including a supporting base channel for a movable bin assembly which extends horizontally between and/or through two or more of the plurality of library systems;

establishing stop locations along the transfer means with at least one stop location positioned within each library system;

providing a command directing the transfer of the movable bin assembly with or without a selected cartridge from one library system to another library system;

enabling the transfer of the movable bin assembly in response to the command; and monitoring the movement of the movable bin assembly between the two or more library systems and of the presence or absence of the cartridge at a specific stop location.

32. The method of claim 31 wherein providing the command and enabling the transfer include directing the movable bin assembly to carry the cartridge, wherein the cartridge is retrieved, transported and loaded in a constant orientation with respect to the stationary cartridge bin arrays and the movable bin assembly.

33. The method of claim 31 including:

installing second transfer means abutted end-to-end with the first transfer means within a common library system and extending therefrom to one or more additional library systems;

establishing stop locations along the second transfer means, with a stop location located in the common library system; and enabling the transfer of the selected cartridge between the first and second transfer means via a respective cartridge handling robot of the common library system.

34. A method of transferring a tape cartridge between two or more individual tape cartridge library systems, wherein each individual library system has a respective stationary cartridge bin array and a cartridge handling robot, comprising:

slidably supporting a movable bin assembly for horizontal translation along a path from an individual library system to, or through, two or more individual library systems;

establishing a depot corresponding to a stop location along the path with at least one depot positioned within each library system;

directing a cartridge handling robot of an individual library system to load a selected cartridge into the movable bin assembly;

enabling the transfer of the selected cartridge within the movable bin assembly from a depot in an individual library system to a depot in another individual library system while maintaining the orientation of the cartridge constant; and directing a cartridge handling robot of said another individual library system to retrieve the selected cartridge from the movable bin assembly to accomplish the transfer of the selected cartridge.

35. The method of claim 34 including:

slidably supporting a second movable bin assembly for translation along a second path abutting end-to-end with the first path within a common library system;

establishing a second depot in the abutted end of the second path within the common library system; and enabling the transfer of the selected cartridge between the first and second movable bin assemblies via a respective cartridge handling robot of the common library system.

36. The method of claim 35 wherein the selected cartridge is retrieved and loaded in a constant orientation with respect to the stationary cartridge bin arrays and the movable bin assemblies.

37. Apparatus for transferring a tape cartridge between selected pluralities of tape cartridge library systems, each library system having a respective stationary cartridge bin array and a cartridge handling robot, comprising:

a first transfer unit extending between one library system and one or more library systems;

said first transfer unit including a first movable bin assembly translatable between said one and said one or more library systems, and a depot corresponding to a preset stop location positioned in each of said library systems;

a second transfer unit having a second movable bin assembly and extending from said one or more library systems to at least one additional library system, said second transfer unit abutting end-to-end with the first transfer unit within a common library system of the one or more library systems and including a second depot positioned in the common library system; and a control circuit operatively coupled to each respective movable bin assembly and depots of each transfer unit for transferring a selected cartridge between library systems of the first or second transfer units, and for transferring the selected cartridge from the first movable bin assembly in the first transfer unit to the second bin assembly in the second transfer unit via the respective depots and the cartridge handling robot in the common library system, to effect the transfer of the cartridge between selected library systems and/or between the selected pluralities of library systems.

38. The apparatus of claim 37 wherein each abutted transfer unit further includes:

support means for slidably supporting the respective movable bin assembly between library systems;

drive means including a motor secured to the support means for translating the movable bin assembly from depot to depot in respective library systems; and sensing means located at each depot for informing the control means of the presence of the movable bin assembly at a respective depot and the presence of selected cartridge in the bin assembly so that the control means coordinates the movement of the respective cartridge handling robot with the translation of the movable bin assembly to effect transfer of the selected cartridge between library systems and also between abutted transfer units.

39. The apparatus of claim 38 wherein the cartridge is retrieved and loaded in a constant orientation with respect to the stationary cartridge bin arrays and the movable bin assemblies.

* * * * *